United States Patent [19]

Williams

[11] Patent Number: 4,554,186

[45] Date of Patent: Nov. 19, 1985

[54] ORGANOALUMINOSILOXANE COATING COMPOSITIONS AND COATED SUBSTRATE

[75] Inventor: Arlene G. Williams, Scotia, N.Y.

[73] Assignee: General Electric Company, Schenectady, N.Y.

[21] Appl. No.: 719,831

[22] Filed: Apr. 4, 1985

Related U.S. Application Data

[62] Division of Ser. No. 625,412, Jun. 28, 1984, Pat. No. 4,528,038.

[51] Int. Cl.$^4$ .......................... B05D 3/02; B32B 9/00; C09K 3/00
[52] U.S. Cl. ............................... 427/387; 106/287.13; 556/173; 528/26; 528/27; 528/30
[58] Field of Search .................. 106/287.13; 556/173; 427/387; 528/26, 27, 30

[56] References Cited

U.S. PATENT DOCUMENTS

| 3,578,619 | 5/1971 | Reeder | 260/448 B |
| 4,434,103 | 2/1984 | Interrante | 260/448 B |
| 4,460,654 | 7/1984 | Interrante | 428/428 |

Primary Examiner—Michael R. Lusignan
Attorney, Agent, or Firm—William A. Teoli; James C. Davis, Jr.; James Magee, Jr.

[57] ABSTRACT

A method is provided for applying an aluminosilicate coating onto a substrate. For example, a superalloy is treated with an organic solvent solution of an aluminosiloxane having an Al/Si ratio having a value of 1 to 5 inclusive which is heated to an elevated temperature.

3 Claims, No Drawings

ORGANOALUMINOSILOXANE COATING COMPOSITIONS AND COATED SUBSTRATE

CROSS REFERENCE TO RELATED APPLICATIONS

This application is a division of application Ser. No. 625,412, filed June 28, 1984, now U.S. Pat. No. 4,528,038, patented July 9, 1985.

Reference is made to the copending application of Leonard V. Interrante, Ser. No. 532,944, filed Sept. 16, 1983, now U.S. Pat. No. 4,460,654, for Aluminosilicate Coating Method, Coated Articles and Organosubstituted Silicon-Oxygen-Aluminum Oligomers, assigned to the same assignee as the present invention.

BACKGROUND OF THE INVENTION

Prior to the present invention, it was generally known that aluminosilicate materials, for example, mullite, a naturally occurring, high temperature performing material composed essentially of chemically combined aluminum, oxygen and silicon atoms $x(Al_2O_3)SiO_2$, where x is 1.5 to 2.0, was an attractive candidate for a variety of high temperature applications. In addition, mullite, unlike closely related aluminum-oxygen-silicon materials, is known to be highly resistant to attack by strong acids and other corrosive reagents, as taught by R. F. Davis and T. A. Pask, "Mullite", pp. 37-76 in "High Temperature Oxides", Part IV, Allen M. Alper, ed., Academic Press, NY (1971). However, no technique was known for making mullite in a form such as a high temperature, corrosion resistant, coating. It would be highly desirable, therefore, to provide a procedure whereby mullite could be made synthetically in an appropriate form to utilize its outstanding properties.

As shown by W.A.D.C. Technical Report, 58-160 ASTIA document No. 155675, The Air Force Inorganic Polymer Program, R. L. Rau (June 1958), Pages 21-25, silicon-oxygen-aluminum polymers can be made by effecting reaction between an aluminum chelate dialkoxide, for example, diisopropoxyaluminum acetylacetonate and a difunctional silane, such as dimethylacetoxysilane. Reaction was carried out in boiling toluene to produce a variety of products varying from soft resins, waxes, or powders. It has been found that the aforementioned aluminum-oxygen-silicon materials of R. L. Rau provide glass-like coatings when heated at temperatures exceeding 350° C. in an oxidizing atmosphere, for example air. However, the resulting aluminosilicate coatings fall outside of the mullite compositions range, and do not provide optimum coating characteristics on ceramic or metal substrates in particular applications. Additional procedures for making organoaluminosilanes are shown by S. N. Varisov et al, Organosilicon Heteropolymers and Heterocompounds, Plenum Press, New York (1970). However, none of these procedures lead to the preparation of organoaluminosilanes with Al/Si atomic ratios in the range appropriate for mullite.

H. Dislich, New Routes to Multicomponent Oxide Glasses, Angewandte Chemie, International Edition Vol. 10, pages 383-434 (1971) has described the preparation of coherent multicomponent oxide glass coatings on various substrates using mixtures of metal alkoxides in organic solvents. Similarly, Yoldas and Partlow, Formation of Continuous Beta Alumina Films and Coatings at Low Temperatures, Ceramic Bulletin, Vol. 59, No. 6, (1980) pages 640-642, describe the preparation of continuous films of $NaAl_{11}O_{17}$ on ceramic substrates using solutions of the corresponding metal alkoxides. In both reports, removal of the organic component is effected by hydrolysis of the organometallic film after deposition and the resultant metal oxide films do not possess the desired thermal and chemical stability characteristic of mullite.

As shown by K. S. Mazdiyasni et al, Synthesis and Mechanical Properties of Stoichiometric Aluminum Silicate (Mullite), Pages 548,552, Vol. 55, No. 11, Journal of the American Ceramic Society, a method for preparing mullite is provided by reacting aluminum triisopropoxide and silicon tetrakisisopropoxide under reflux conditions in isopropyl alcohol. The resulting alkoxide solution can be ammoniated to produce the corresponding hydroxy aluminosilicate which can be dried in vacuum to produce mullite powders. However, the aforementioned technique was unsuitable for applying a mullite coating onto various substrates.

Improved results have been obtained as shown by U.S. Pat. No. 4,434,103, Interrante, assigned to the same assignee as the present invention, when chelated aluminum alkoxide of the formula

(1)

where R is a polyvalent organic radical, Y is selected from a $C_{(1-13)}$ monovalent hydrocarbon radical and substituted $C_{(1-13)}$ monovalent hydrocarbon radical, and Z is selected from O—, —S— and —N≡, were coreacted with difunctional organosilane to produce an organic substituted silicon-oxygen-aluminum oligomer referred to hereinafter as the "organoaluminosiloxane". The organoaluminosiloxane was applied onto a temperature resistant substrate as an organic solvent solution which was transformed into an aluminosilicate coating upon heating. Although the aforementioned method of Interrante provided valuable aluminosilicate coatings on various substrates, it was often not possible to obtain a precise control over the Al/Si ratio in the organoaluminosiloxane or the resulting aluminosilicate coating derived therefrom. This resulted in an aluminosilicate coating providing a reduced degree of corrosion protection. The degree of corrosion protection provided by an aluminosilicate coating can be determined by the gain in weight of an aluminosilicate coated sample subjected to a sodium sulfite-sulfur trioxide atmosphere at 750° C. In addition, the use of a difunctional silane as a coreactant with the chelated aluminum alkoxide of formula (1) requires an initial prehydrolysis of such chelated aluminum alkoxide before the hydrolysis product can be coreacted with the difunctional organosilane.

The present invention is based on the discovery that organosilane having the formula,

where $R^1$ is selected from Y radicals as previously defined and "a" has a value of about 2.5 to 3 inclusive, can be directly coreacted with a chelated aluminum alkoxide of formula (1) in the presence of an organic solvent to produce an organic solvent soluble organoaluminosiloxane having a predictable Al/Si ratio such as 3 to 1. In addition, the production of such organoaluminosiloxane in accordance with the practice of the present invention does not require any prehydrolysis of the chelated aluminum alkoxide of formula (1) as required in the method of Interrante, U.S. Pat. No. 4,434,103.

Although it is not completely understood why a predictable Al/Si ratio is feasible in the organoaluminosiloxane made in accordance with the practice of the present invention, and not in accordance with the method of U.S. Pat. No. 4,434,103, one possible explanation is that the use of difunctional silane results in the formation of cyclopolydiorganosiloxane which readily separates from the organoaluminosiloxane coating upon pyrolysis during the formation of the aluminosilicate coating.

STATEMENT OF THE INVENTION

There is provided by the present invention organoaluminosiloxane coating compositions comprising by weight (A) 100 parts of an inert organic solvent, and
(B) 10 to 20 parts of an organoaluminosiloxane having an Al/Si ratio whose value can vary between 1 to 5 inclusive consisting essentially of chelated aluminum units of the formula

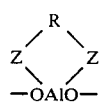

chemically combined with $(R^1)_a SiO_{(4-a)/2}$ units, where R, $R^1$, Z and a are as previously defined.

There is also included in the practice of the present invention, a method for applying an aluminosilicate coating having a predictable Al/Si ratio onto a thermally insensitive substrate which comprises (1) contacting the substrate with an organoaluminosiloxane coating composition as defined above, in the substantial absence of moisture and effecting the removal of solvent from the resulting treated substrate, (2) heating the treated substrate in an oxidizing atmosphere to a temperature of 450° to 700° C. until an aluminosilicate coating is formed.

Chelated aluminum alkoxides of formula (1) which can be utilized in the practice of the present invention are, for example

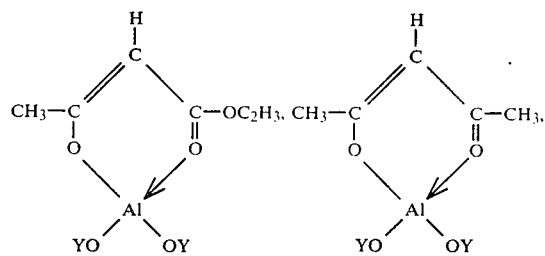

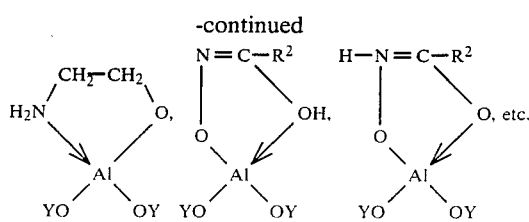

where Y is selected from $CH_3$, $C_2H_6$, $C_3H_7$, etc., and $R^2$ is selected from H, $CH_3$, $C_2H_6$, etc.

Organosilane of formula (2) which can be utilized in the practice of the present invention include, for example, monofunctional silanes such as

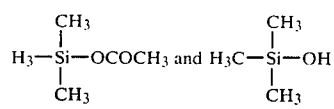

In addition to the above trimethylsilanes, there can be used organohalosilanes, for example trimethylchlorosilane, which preferably are used in combination with an HCl scavanger. In addition, there can be used mixtures of organosilanes, such as a mixture dimethyldiacetoxysilane and trimethyldiacetoxysilane having a ratio of 2.5 to 3 $R^1$ radicals per silicon atom.

Radicals included within R of formula (1) are, for example,

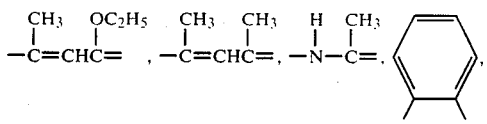

and —$CH_2CH_2$—. Radicals included within $R^1$ and Y of formulas (1) and (2) are for example, $C_{(1-8)}$ alkyl radicals, for example, methyl, ethyl, propyl, butyl, etc.; alkenyl radicals, for example, vinyl, propenyl, etc.; aryl radicals, for example phenyl, naphthyl, etc. Additional $R^1$ radicals are for example, cyanoethyl and trifluoropropyl.

Temperature insensitive substrates which can be treated in accordance with the practice of the method of the present invention are, for example, fused silica, alumina, silicate glasses, titanium metal, inconel, tungsten carbide, superalloys, silicon, etc.

In the practice of the present invention, the organoaluminosiloxane coating compositions of the present invention can be made by adding the organosilane directly to the chelated aluminum alkoxide of formula (1) in the presence of an inert organic solvent, for example, a solvent free of reactive —OH radicals, such as alcohols. Preferably, the addition is conducted under substantially anhydrous conditions. Suitable inert organic solvents are, for example, benzene, toluene, chloroform, methylene chloride, acetone, ethers, etc. The organosilane is preferably added in the form of an organic solvent solution. The chelated aluminum alkoxide also can be utilized in the form of an organic solvent solution during the organosilane addition. Upon agitating the resulting mixture, the homogeneous solution can be brought to reflux temperature to effect the separation of volatile side products and solvent until a highly concentrated product is obtained. Trace amounts of organic solvent and volatiles can then be removed if desired from the resulting organoaluminosiloxane by the employment of reduced pressure, such as 0.02 to 0.10 torr, at ambient temperature.

A suitable temperature insensitive substrate such as a ceramic substrate, or superalloy substrate can then be treated with the organoaluminosiloxane. Preferably, treatment is effected in the substantial absence of moisture to minimize hydrolysis of reactive moisture sensitive functional group attached to silicon or aluminum. The treated substrate is preferably allowed to remain in an inert atmosphere to provide removal of organic solvent until a tack-free hard coating is formed. The coated substrate can thereafter be heated at a temperature of from 450° C. to 700° C. in an oxidizing atmosphere for a time sufficient to oxidize any organic material on the treated substrate. A suitable oxidizing atmosphere is, for example air, or an oxygen containing gas or mixture thereof.

In order that those skilled in the art will be better able to practice the present invention, the following examples are given by way of illustration and not by way of limitation. All parts are by weight.

EXAMPLE 1

A solution of 4.356 g (0.033 moles) of trimethylacetoxysilane in 10 ml of benzene was added dropwise under substantially anhydrous conditions to a stirred solution of 4.059 grams (0.0165 mole) of bis(isopropoxy)acetylacetonate aluminum (3) in 20 ml of benzene. The homogeneous solution was brought to reflux temperature, where volatiles, side products and solvent were removed by distillation until a highly concentrated product was obtained. The remaining solvent and volatile side products were removed at ambient temperatures at 50 torr. Based on method of preparation, there was obtained an organoaluminosiloxane having the following average formula

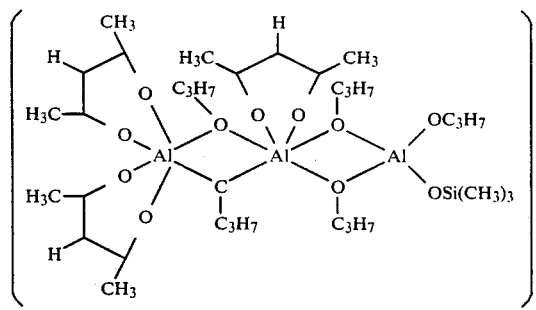

where n can have a value of about 1 to 7.

The identity of the above product was further confirmed by elemental analysis and GC and $^1$HNMR analysis. A 30% solution of the organoaluminosiloxane was then prepared in toluene. A 2 cm × 2 cm piece of Hastalloy C, nickelbased super alloy was dipped into the organoaluminosiloxane solution under substantially anhydrous conditions and the coated alloy was then heated to a temperature of 500° C. in air for 180 minutes. There was obtained a Hastalloy C strip coated with a uniform tough corrosion resistant aluminum silicate coating.

EXAMPLE 2

The procedure of Example 1 was repeated, except that a series of organoaluminosiloxane coating compositions were prepared utilizing bis(isopropoxy)acetylacetonate aluminum and either trimethylacetoxysilane or dimethylacetoxysilane in benzene as a solvent. The proportions of the coreactants were varied to provide for the production of organoaluminosiloxane products having an Al/Si ratios over a range of from 1 to 5. Recovery of the various organoaluminosiloxanes using the same stripping procedure as in Example 1 resulted in the production of various organoaluminosiloxanes which were analyzed for aluminum and silicon content by elemental analysis and GC and $^1$HNMR analysis. The following results were obtained, where "A" represents organoaluminosiloxane products which were made utilizing dimethyldiacetoxysilane, "B" represents organoaluminosiloxane products which were made utilizing trimethylacetoxysilane and "Starting Materials" means the Al/Si ratio of the reactants used in the reaction mixture prior to stripping and "Products" means the Al/Si ratio after stripping:

TABLE I

| Starting Materials (Al/Si ratio) | Products A | B |
| --- | --- | --- |
| 1.0 | 3.07 | 1.04 |
| 2.0 | 3.62 | 2.02 |
| 3.0 | 3.76 | 3.12 |
| 4.0 | 4.61 | 4.07 |
| 5.0 | 11.46 | 5.10 |

The above results show that organoaluminosiloxanes prepared in accordance with the practice of the present invention utilizing organosilane having an average of from 2.5 to 3 $R^1$ radicals per silicon atom, provide organoaluminosiloxanes in which the Al/Si ratio is approximately the same in the resulting organoaluminosiloxane as utilized in the initial reaction mixture. However, in instances where the starting organosilane have less than 2.5 $R^1$ radicals per silicon atom, such as dimethyldiacetoxysilane, a significant variation in the resulting organoaluminosiloxane with respect to the Al/Si ratio can be obtained as compared to the original Al/Si ratio utilized in the original reaction mixture. One possible explanation is that the dimethyldiacetoxysilane used resulted in the production of cyclic polysiloxanes which tended to self polymerize instead of coreact with the bis(isopropoxy)acetylacetonate aluminum.

EXAMPLE 3

In accordance with the procedures of Examples 1 and 2 a series of organoaluminosiloxane coating compositions were prepared from benzene solutions of bis(isopropoxy)acetylacetonate aluminum and either trimethylacetoxysilane or dimethyldiacetoxysilane. The proportions of the silanes utilized with respect to the bis(isopropoxy)acetylacetonate was sufficient to provide for an Al/Si ratio in the resulting organoaluminosiloxane having a value of about 3. Coating compositions were prepared from the respective organoaluminosiloxanes which were then used to coat CoCrAlY test pins by dipping the pins into the respective solutions. The coated pins were then subjected to oxidation at temperatures in the range of between 1000° to 1500° C. for a period of 1 hour to determine the ability of the resulting aluminosilicate coating to resist oxidation which could be measured by measuring the gain in weight of the oxidized surface. Controls were also prepared of the CoCrAlY pins which were uncoated. The following results were obtained where "A" represents aluminosilicate coated nickel alloy which was made by oxidizing nickel alloy pins which had been treated with organoaluminosiloxane derived from the use of dimethyldiacetoxysilane and bis(isopropoxy)acetylacetonate aluminum. Nickel alloy pins treated in accordance with the practice of the present invention resulting from the employment of organoaluminosiloxanes derived from the use of trimethylacetoxysilane in accordance with the procedure of Example 1 are shown as "B". The following results were obtained:

TABLE 2

| Sample No. | Coating Material | Oxidation temp °(C.) | Weight Gain mg/cm$^2$ |
|---|---|---|---|
| 1 | None | 1000 | 0.5816 |
| 2 | A | 1000 | 0.4835 |
| 3 | B | 1000 | 0.1012 |
| 4 | None | 1500 | 1.2432 |
| 5 | A | 1500 | 0.9057 |
| 6 | B | 1500 | 0.2112 |

The above results show that the aluminosilicate coated pins made in accordance with the practice of the present invention (B) have superior corrosion resistance as compared to pins which were not treated with organoaluminosiloxane, or which were treated with organoaluminosiloxane made from coreacting dimethyldiacetoxysilane and bis(isopropoxy)acetylacetonate aluminum (A).

Although the above examples are directed to only a few of the very many variables which can be utilized in the practice of the present invention, it should be understood that the present invention is directed to a much broader variety of organoaluminosiloxanes and methods for making such materials and the use of such materials in coating various substrates.

What I claim as new and desire to secure by Letters Patent of the United States:

1. A method for applying an aluminosilicate coating having a predictable Al/Si ratio onto a substrate thermally insensitive to temperatures up to 1500° C. which comprises
   (1) contacting the substrate with an organic solvent solution of an organoaluminosiloxane and thereafter effecting the separation of organic solvent from the treated substrate,
   (2) heating the treated substrate to a temperature of 450° to 700° C. until an aluminosilicate coating is obtained, where the organic solvent solution of an organoaluminosiloxane is a composition comprising an organoaluminosiloxane coating compositions comprising by weight
   (A) 100 parts of an inert organic solvent, and
   (B) 10 to 30 parts of an organoalumoinosiloxane oligomer having an Al/Si ratio having a value of 5 to 1 and consisting essentially of

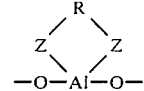

units chemically combined with $(R^1)_a SiO_{(4-a)/2}$ units
where R is a polyvalent organic radical, $R^1$ is selected from a $C_{(1-13)}$ monovalent hydrocarbon radical and substituted $C_{(1-13)}$ monovalent hydrocarbon radical, Z is selected from —O—, —S— and —N=, and a has a value of 2.5 to 3.

2. A method for making an organoaluminosiloxane having an Al/Si ratio of 1 to 5, which comprises
   (1) effecting reaction between a chelated aluminum alkoxide of the formula,

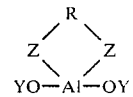

and organosilane of the formula, $(R^1)_a SiX_{4-a}$ in the presence of an organic solvent,
   (2) stripping the resulting mixture of (1) of volatiles at a temperature up to 120° C., where R is a polyvalent organic radical, $R^1$ is selected from a $C_{(1-13)}$ monovalent hydrocarbon radical and substituted $C_{(1-13)}$ monovalent hydrocarbon radical, Z is selected from —O—, —S— and —N=, and has a value of 2.5 to 3.

3. A method in accordance with claim 2, where the aluminum alkoxide is bis(isopropoxy)acetylacetonate aluminum (III) and the organosilane is trimethylacyloxysilane.

* * * * *